(No Model.)
J. G. RODGERS.
RUBBER TIRE.
No. 539,826.   Patented May 28, 1895.
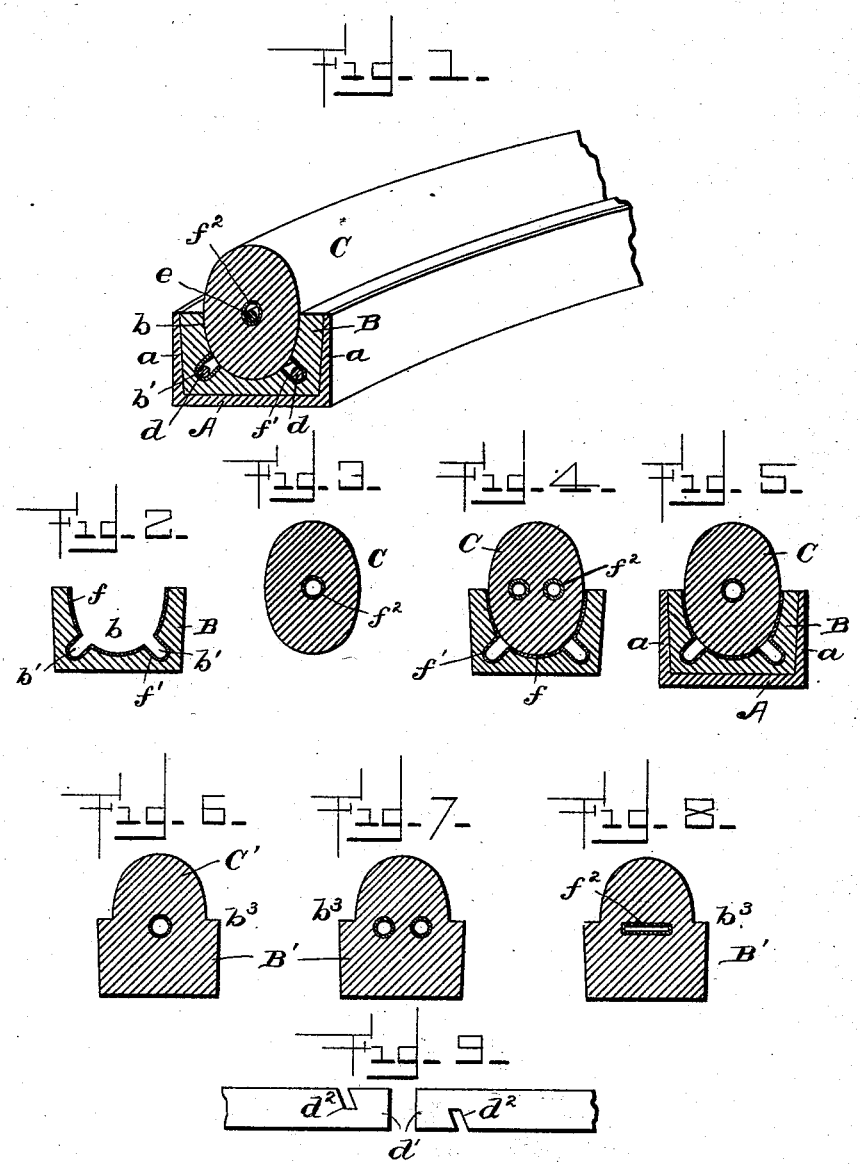
Witnesses:
T. S. Harding
G. P. Norris
Inventor.
James G Rodgers,
By A. M. Smith & Son,
Attorneys.

UNITED STATES PATENT OFFICE.

JAMES G. RODGERS, OF SPRINGFIELD, OHIO.

RUBBER TIRE.

SPECIFICATION forming part of Letters Patent No. 539,826, dated May 28, 1895.

Application filed July 14, 1894. Serial No. 517,561. (No model.)

*To all whom it may concern:*

Be it known that I, JAMES G. RODGERS, a citizen of the United States, and a resident of Springfield, county of Clark, and State of Ohio, have invented new and useful Improvements in Rubber Tires for Vehicle-Wheels, of which the following is a full, clear, and exact description, reference being had to the accompanying drawings, making part of this specification.

My invention relates to that class of tires made of rubber and held within a flanged or concave rim, and consists in making the rubber tire in two parts, extending peripherally around the rim, the inner part conforming to the shape of the flanged rim, in cross section, fitting snugly therein and having a peripheral groove to receive the outer part of the rubber tire fitting therein; in terminating the inner part of the rubber tire, fitting within the rim, in shoulders, or at the outer edges of the rim flanges and making the outer, wearing part of the tire of less diameter than the inner part and than the distance between said flange edges so that it cannot be pressed outward over said flanges to be cut thereby; in providing the outer or wearing part of the tire with a longitudinal bore and a metallic core and compressing the rubber thereon and in the means for securing the parts of the tire to each other and to the wheel rim, all as hereinafter described and claimed.

In the accompanying drawings, Figure 1 is a perspective view showing a portion in section of a wheel-rim and tire embodying my invention. Fig. 2 shows the inner part of the rubber tire, and Fig. 3 the outer or wearing part thereof, both detached and in cross-section, and Fig. 4 a similar view of the two parts assembled. Fig. 5 represents a cross-section through the rim and two-part tire. Figs. 6, 7, and 8 represent transverse sections through the tire, showing modifications hereinafter explained; and Fig. 9 shows the ends of a flat metal core provided with slits or notches for uniting them.

A indicates the metal rim, made, preferably, substantially rectangular in form, in cross-section, and this may be secured to the spokes or wooden rim of the wheel in any usual or preferred manner.

B indicates the inner part of the rubber tire, shown detached and in section in Fig. 2. It is made to conform, on its outer face, in cross-section, to the form of the groove and of a depth, at its side, corresponding to the depth of the groove in the rim, so as to terminate at the outer edges of the peripheral flanges $a$, $a$, forming the sides of said groove. This inner part of the rubber tire is molded with a central, peripheral groove, $b$, of rounded or semi-elliptical form, to receive an outer part $C$, of the tire, made of rubber, and, preferably, round or elliptical in form, in cross-section, to match the groove $b$, and at the sides of the bottom of said groove, smaller, parallel grooves $b'$, $b'$, are formed, through which wires $d$, may be extended and united at their ends for clamping the part B in the grooved rim. On account of the grooves $b'$, opening into the main or tire groove $b$, it will be apparent that the confining wires or metallic cores can be readily placed in the said grooves and their ends conveniently joined, for holding the bed or cushion in place or against displacement. Where preferred, the part B may be fastened in the rim, by cementing it therein, in the usual manner, in which case the wires can be dispensed with, or both the wires and cement can be used, if desired, thereby insuring a firm union of the part B of the rubber tire or tread with the metallic rim.

The outer part C of the rubber tire, or tread, is provided with a central bore or perforation and through this a wire $e$, or other suitable form of metal core is drawn, and the rubber being compressed thereon, to give it the desired power of resistance, the ends of the core are joined, in any suitable manner, to prevent its stretching, the recoil of the compressed rubber serving to hold the ends of the rubber tire in snug contact, without the aid of cement, though the latter may be used if desired. The part C may also be fastened with cement in the groove of the part B, but for all ordinary purposes, the metallic core, drawn tightly and having its ends firmly joined to prevent its stretching, will be sufficient. The central bore of the outer part C adds to its elasticity and the rounded form of said part makes it practicable to readily turn it, when its outer, wearing surface becomes so cut or worn by use as to make such turning desirable, for presenting a new wearing surface. By making the part C separate from and removable, without disturbing the part B, it can be readily turned, when it becomes worn, and, it can also be replaced by a new outer part, when required, without necessitating the removal of the inner part of the tire, thereby greatly lessening the cost of renewal. On account of the peculiar form of the inner cushion part B, terminating in shoulders at the edges of the flanges $a$, of the metal rim A, and the diminished diameter of the outer wearing part C of the tire, I am enabled to use a very soft grade of rubber stock in the manufacture of the tire C, which as is well understood, gives greater life and power of resistance to the tire.

In Figs. 6, 7 and 8, the tire is shown made in one piece, the inner part, indicated by B', terminating in shoulders $b^3$, at the outer edges of the rim flanges, and the semi-cylindrical or semi-elliptical part C', (corresponding to the part C) rising centrally from the periphery of the part B', with its sides sufficiently removed from the rim flanges to prevent the part C' from being crowded over upon and cut by said flanges. In this construction, the tire may be perforated for one wire, as in Fig. 6, for two, as in Fig. 7, or for a flat metal core, as in Fig. 8. Where the latter is used, its ends, indicated in Fig. 9, at $d'$, $d'$, may have inclined slits or notches $d^2$, cut in their opposing edges, extending half the width of the flat strip or core, for coupling the ends firmly and bringing them into the same vertical plane. In either case the rubber should be considerably compressed, longitudinally, on the core, it having been found, by practical test, that rubber, under compression, will much more successfully resist injury from rough and cutting surfaces of the road over which it passes in use.

The particular form of core is immaterial, so long as it prevents the elongation of the tire and has the rubber compressed upon it for the purpose explained.

I have shown how the two part rubber tire can be formed in a single piece, but it is preferred to make the outer part C, separate from the inner part B, as facilitating its turning and reducing the cost of repairs.

In practice, it is preferred to mold or form the two parts B and C of the rubber, each, upon an inner facing or core of canvas or other suitable fabric, indicated, in the part B, by $f$ and $f'$ and in the part C by $f^2$, said lining extending through the entire core of the part C and concavities or hollows in the outer face of the part B, after which the two parts can be brought together and vulcanized into one, or otherwise united as above described, as may be preferred. By thus reinforcing the rubber it is further guarded against stretching, and all danger of tearing or mutilation by the metallic cores, where the latter are used, is obviated.

Having thus described my invention, I claim as new—

1. A two part rubber tire for vehicle wheels, consisting of an inner bed or cushion, part, made approximately square or rectangular in shape in cross-section, conforming to the shape of and confined wholly within the wheel rim and formed with a peripheral groove or concavity in its outer face, for the reception of and in combination with an outer, wearing part of rubber, made of less diameter than the bed or cushion part and embedded therein, and a non-extensible, metallic core for said outer part, for securing the same to and within the groove of the inner bed or cushion, in the manner substantially as specified.

2. A two-part rubber tire for vehicle wheels, consisting of an inner bed or cushion part, made approximately rectangular in shape, in cross-section, on its face, conforming to the flanged rim in which it is confined and provided with a peripheral, fabric lined groove on its outer face for the reception of and in combination with a rounded outer, wearing part of rubber, of less diameter than the cushion part and embedded therein, the cushion part terminating at the edges of the wheel-rim flanges in shoulders extending to the wearing part, for preventing the latter from coming in contact with said edges, substantially as described.

3. A rubber tire for vehicle wheels, consisting of an inner or base part, of rubber, formed with a peripheral, longitudinal tire holding groove for the reception of an outer part or tire of rubber, and provided with parallel grooves, opening into said tire groove for its retaining wires, in combination with a rounded, outer part, or tire, embedded in said grooved part and having a longitudinal bore or perforation, and the central, metallic core on which said outer part is compressed and which prevents its elongation, substantially as described.

4. The combination with a double-flanged metallic rim, of a rectangular bed or cushion of rubber, conforming to the shape of said rim and contained wholly within the same and formed with a peripheral groove for the reception of the tire, and with supplemental grooves, opening into said tire groove, for the retaining wires or cores, in combination with an outer, wearing part, or tire proper, of rubber, embedded in said bed or cushion and facing or layer of canvas, applied to and covering or lining the tire-groove, and also the supplemental core-grooves, for protecting the same from injury, substantially as described.

5. The combination in a rubber tire, made in two parts of an inner, grooved bed or cushion part, confined within and conforming to the shape of the flanged rim, and the outer wearing part, of rubber, lying in the groove of and surrounding said inner part, and the flat, metallic core, for the outer part, provided with the slits or notches for uniting the ends thereof, in the manner and substantially as described.

In testimony whereof I have hereunto set my hand this 11th day of July, A. D. 1894.

JAMES G. RODGERS.

Witnesses:
A. S. RODGERS,
W. B. RODGERS.